United States Patent [19]
Suzuki

[11] Patent Number: 5,471,453
[45] Date of Patent: Nov. 28, 1995

[54] INFORMATION RECORDING-REPRODUCING APPARATUS

[75] Inventor: Yasuo Suzuki, Tokyo, Japan

[73] Assignee: Canon Kabushiki Kaisha, Tokyo, Japan

[21] Appl. No.: 33,973

[22] Filed: Mar. 19, 1993

Related U.S. Application Data

[63] Continuation of Ser. No. 753,933, Sep. 3, 1991, abandoned.

[30] Foreign Application Priority Data

Sep. 13, 1990 [JP] Japan .................................. 2-241234

[51] Int. Cl.⁶ .................................................. G11B 7/00
[52] U.S. Cl. ........................ 369/100; 369/219; 369/244
[58] Field of Search ................................ 369/100, 212, 369/219, 220, 223, 244, 249

[56] References Cited

U.S. PATENT DOCUMENTS

| | | | |
|---|---|---|---|
| 4,797,866 | 1/1989 | Yoshikawa | 369/110 |
| 4,914,647 | 4/1990 | Ono et al. | 369/77.2 |
| 4,932,019 | 6/1990 | Bessho | 369/249 |
| 4,958,336 | 9/1990 | Suzuki et al. | 369/44.21 |
| 5,097,462 | 3/1992 | Fujita et al. | 369/109 |
| 5,115,423 | 5/1992 | Maeda et al. | 369/110 |

FOREIGN PATENT DOCUMENTS

| | | |
|---|---|---|
| 0350225 | 1/1990 | European Pat. Off. . |
| 0379285 | 7/1990 | European Pat. Off. . |
| 0385609 | 9/1990 | European Pat. Off. . |

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

In a separation type optical head which is divided into two portions, i.e., a fixed head portion and a carriage portion and which effects at least one of recording, reproduction and erasing on a disk-like recording medium by a light beam, optical parts constituting the fixed head portion are directly mounted on the surface of a base bed on which is mounted a guide member for supporting the carriage portion for seeking.

5 Claims, 3 Drawing Sheets

INFORMATION RECORDING-REPRODUCING APPARATUS

This application is a continuation of prior application Ser. No. 07/753,933 filed Sep. 3, 1991, now abandoned.

BACKGROUND OF THE INVENTION

1. Field of the Invention

This invention relates to an optical type information recording-reproducing apparatus such as a magneto-optical disk apparatus, and particularly to a separation type optical head contained in such an apparatus.

2. Related Background Art

FIG. 1 of the accompanying drawings shows a perspective view of a prior art optical system for a disk-like recording medium. Information tracks T are formed on a disk D rotated by a driving device, not shown, and an objective lens 1 is disposed below the disk D. This objective lens 1 is movable in a direction X, i.e., the focusing direction, which is the direction of the optical axis thereof and a direction Y orthogonal to the direction X, i.e., the tracking direction, by an actuator, not shown. A laser beam emitted from a semiconductor laser source 2 irradiates the surface of the disk D via a collimator lens 3, a beam shaping prism 4, a first polarizing beam splitter 5, a mirror 6 and the objective lens 1. The laser beam L reflected and turned back by the disk D is divided into two laser beams by a second polarizing beam splitter 8 via the objective lens 1, the mirror 6, the polarizing beam splitter 5 and a condensing lens 7, and one of the two laser beams enters a servo sensor, not shown, and the other laser beam enters a third polarizing beam splitter 9 and is further divided into two laser beams thereby, and these two laser beams enter RF sensors, not shown. The difference between signals detected by these two RF sensors is found, whereby information recorded on the surface of the disk D is read. The optical system comprising these optical parts is provided in a carriage 10 and is adapted to be moved bodily with the carriage 10 in the seek direction S (the radial direction of the disk D).

FIG. 2 of the accompanying drawings is a perspective view of the optical system of a separation type optical head devised to shorten the seek time of the optical head. The optical system is separated into two by a carriage portion 13 in which a movable portion is constructed of only a necessary minimum portion to make the movable portion light in weight and a fixed head portion 14 fixed to the apparatus, and the polarizing beam splitter 5 and the mirror 6 which are in contact with each other in FIG. 1 are separated and disposed in face-to-face relationship with each other. The carriage portion 13 having the mirror 6 and the objective lens 1 is movable in the seek direction S by an actuator, not shown, and the objective lens 1 is supported for movement in the focusing direction and the tracking direction, and faces the disk D.

The laser beam L which has emerged from the polarizing beam splitter 5 travels parallel to the seek direction, enters the mirror 6 of the carriage portion 13 and irradiates the disk D. The laser beam L reflected by the disk D travels back along the optical path and returns to the fixed head portion 14.

In this separation type head, it is necessary that the laser beam L emerging from the fixed head portion 14 be made parallel to a guide rail for guiding the carriage portion 13 so that whether the carriage portion 13 is on the inner periphery or the outer periphery of the disk D, the position of the optical axis does not change. For this purpose, when mounting the fixed head portion 14 on a base bed, the fixed head portion is rotated in a direction a, b about a horizontal direction orthogonal to the seek direction S and a direction c, d about a vertical direction, to thereby adjust the direction of the laser beam L so as to be parallel to the seek direction S.

FIG. 3 of the accompanying drawings shows an adjusting mechanism for the direction a, b. Belleville springs 17 are inserted between the fixed head portion 14 and the mounting portion 16 of the base bed 15 thereof, and by these belleville springs 17 being adjusted, the fixed head portion 14 is inclined to thereby change the direction of the laser beam L.

However, in the example of the prior art described above, in the adjustment of the fixed head portion 14 in the direction a, b, the fixed head portion 14 is displaced relative to the horizontal direction to thereby accomplish the adjustment. This gives rise to a problem that the adjustment slips off by the temperature or heat cycle after the adjustment, or a variation with time or the like, and the optical axis moves to cause an increase in cross talk and a reduction in the reliability of an RF signal and further it becomes difficult for the servo to perform its function fully.

SUMMARY OF THE INVENTION

It is the object of the present invention to eliminate the above-noted problem and to provide an information recording-reproducing apparatus which suffers little from the movement of the optical axis by temperature, heat cycle or a variation with time.

To achieve the above object, in a separation type optical head according to the present invention which is divided into two portions, i.e., a fixed head portion and a carriage portion and which effects at least one of recording, reproduction and erasing on a disk-like recording medium by a light beam, optical parts constituting said fixed head portion are directly mounted on the surface of a base bed on which is mounted a guide member for supporting said carriage portion for seeking.

In the separation type optical head having the above-described construction, the optical member of the fixed head portion is directly fixed to the base bed and the movement of the optical axis by temperature, heat cycle or a variation with time is small.

DETAILED DESCRIPTION OF THE PREFERRED EMBODIMENTS

Figure 1:
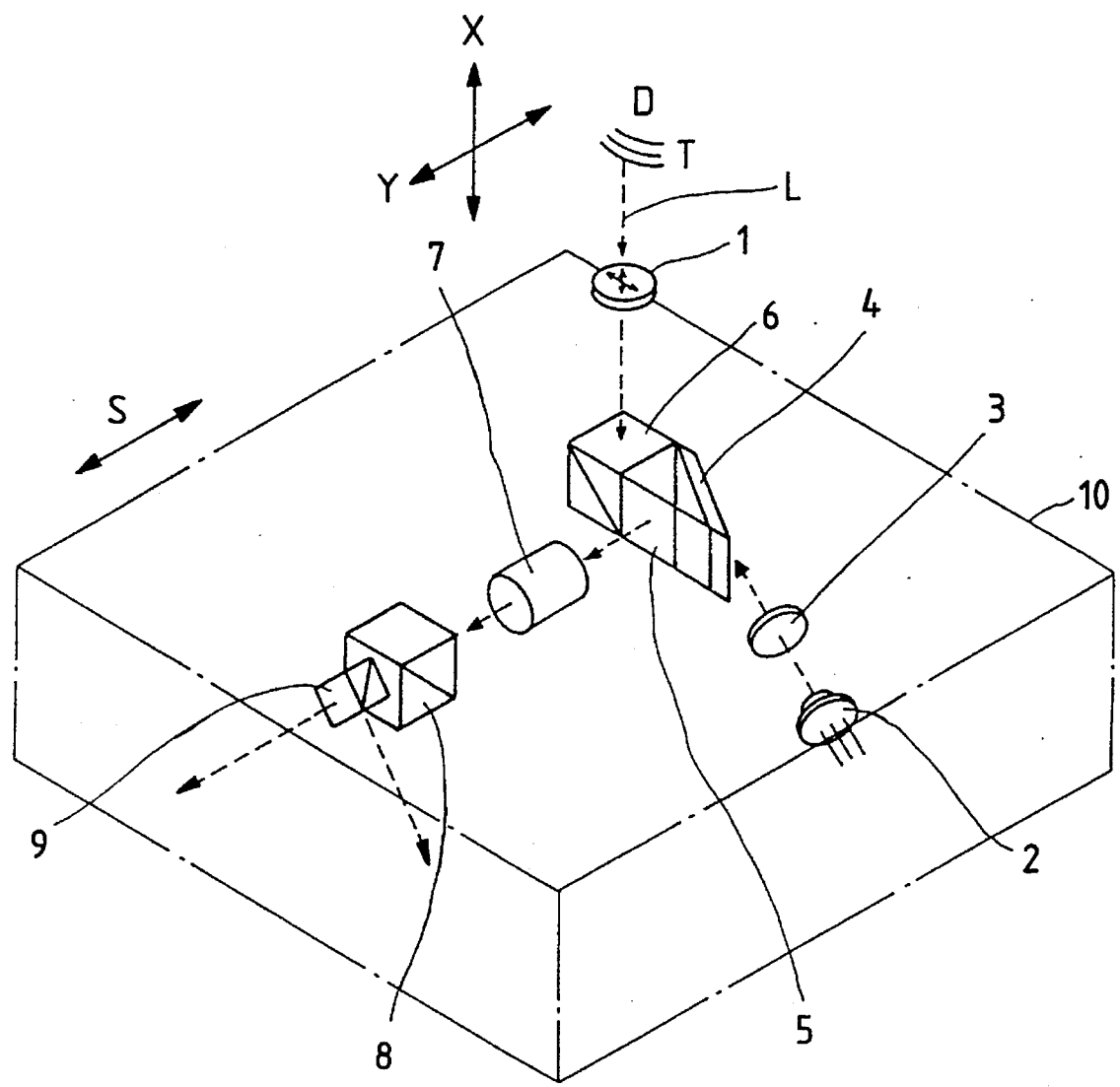
FIG. 1 is a perspective view showing the arrangement of the optical system of a unitary type optical head according to the prior art.
Figure 2:
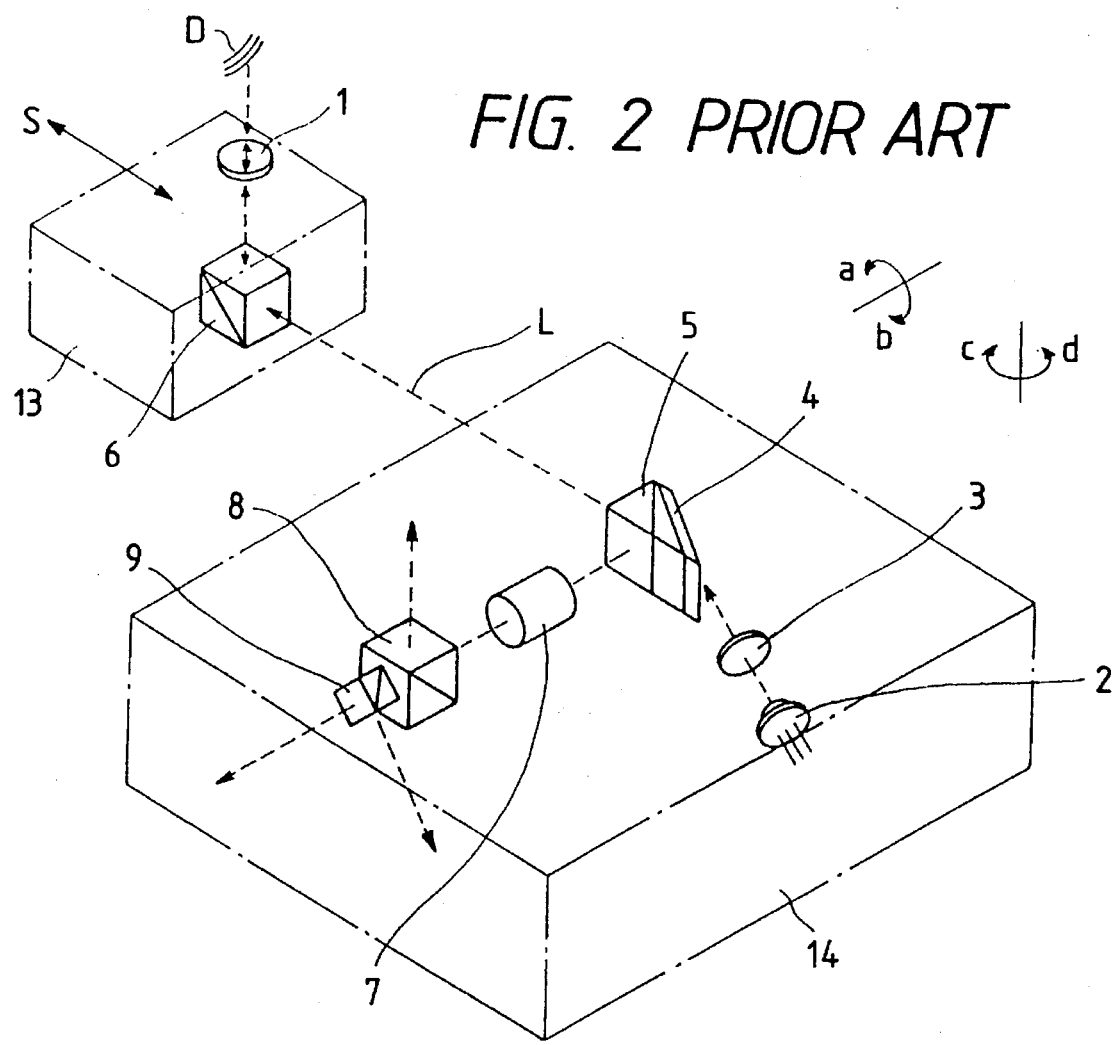
FIG. 2 is a perspective view showing the arrangement of the optical system of a separation type optical head according to the prior art.
Figure 3:
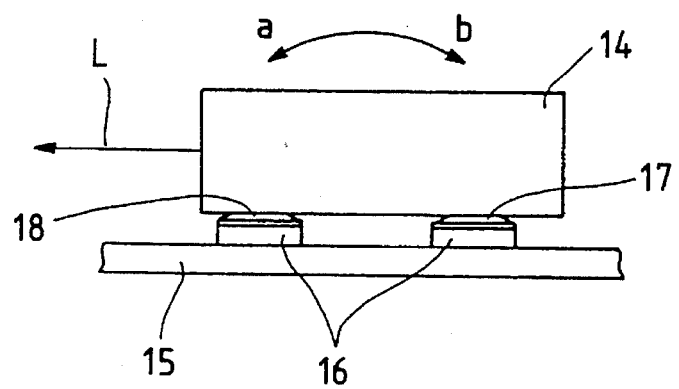
FIG. 3 shows optic axis adjusting means in the separation type optical head according to the prior art.

The present invention will hereinafter be described in detail with respect to an embodiment thereof shown in FIG. 4, wherein members identical to those in the examples of the prior art are designated by identical reference numerals.

Figure 4:
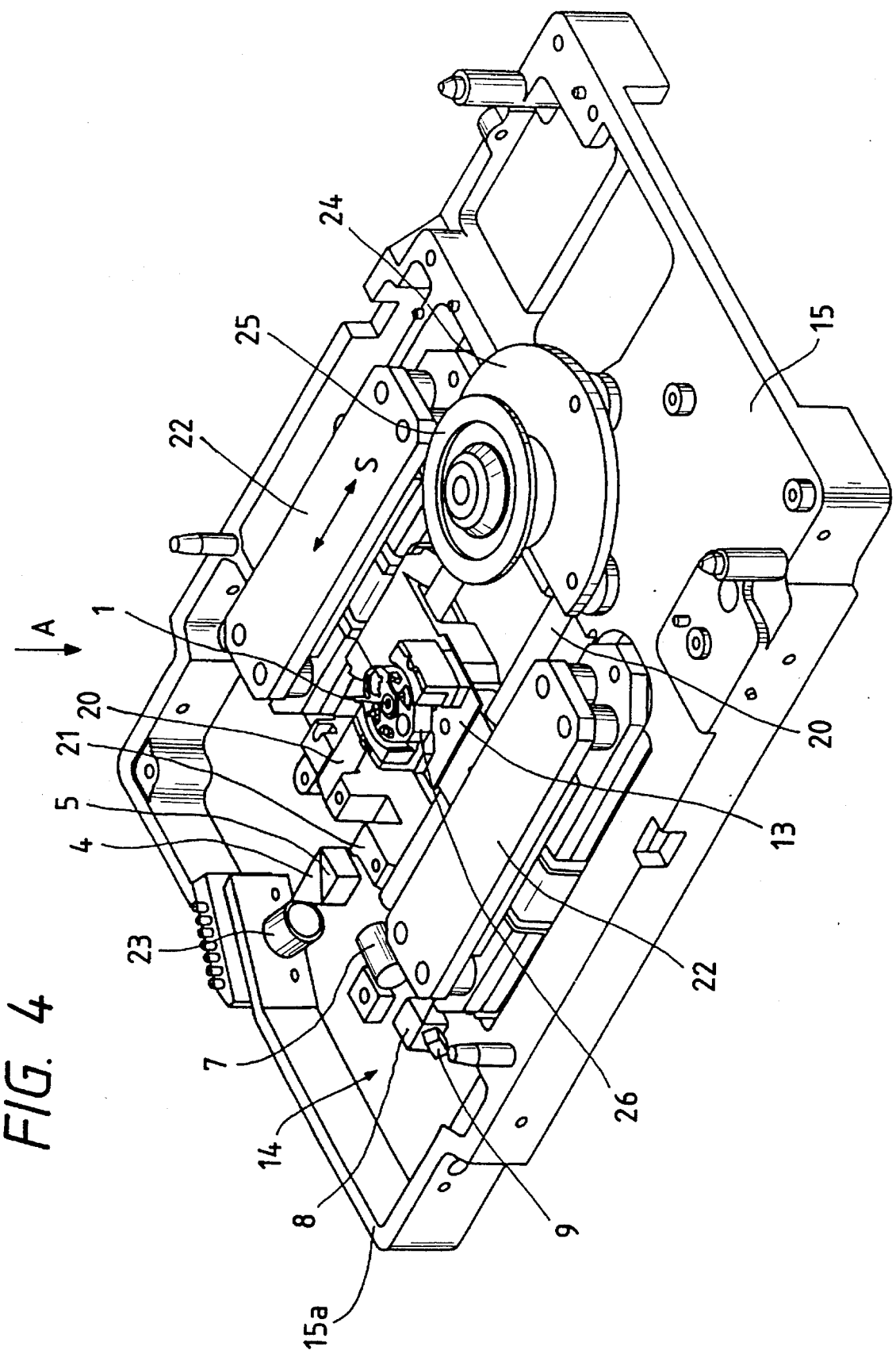
FIG. 4 is a perspective view of an information recording-reproducing apparatus according to the present invention.

Referring to FIG. 4 which is a perspective view of an optical type information recording-reproducing apparatus on which is mounted a separation type optical head according to the present invention, various members are disposed on a base bed 15. Two parallel guide rails 20 and 20 facing in the seek direction S are mounted on the center of the base bed 15 with leaf springs 21 interposed between the opposite ends thereof, and a carriage portion 13 supported by the guide rails 20 and 20 is movable along the guide rails 20 and 20 in the seek direction S by a linear motor 22 also mounted on the base bed 15. A fixed head portion 14 is provided on the extension of one end of the guide rails 20 and 20, and a laser unit 23 comprising a semiconductor laser source 2 and a collimator lens 3 made integral with each other, a beam shaping prism 4, polarizing beam splitters 5, 8, 9 and a condensing lens 7 (sensor lens) are disposed on and directly secured to the surface of the base bed 15 by an adhesive or a fixing member. On the extension of the other end of the guide rails 20 and 20, a spindle motor 24 having its rotary shaft directed in a vertical direction is fixed to the base bed 15, and a turntable 25 is mounted on the rotary shaft of the spindle motor 24. An actuator 26 is provided on the upper part of the carriage portion 13, whereby the objective lens 1 is made movable in the direction of the optical axis, i.e., the focusing direction, and in the radial direction of a recording medium, i.e., the tracking direction.

The optical parts of the fixed head portion 14 are directly fixed to chiefly the upwardly facing flat surface of the base bed 15 (this flat surface is parallel to the surface determined by the center axes of the guide rails 20 and 20 mounted on the base bed 15), and the laser unit 23 is mounted on the inwardly facing surface (the wall surface perpendicular to said flat surface) of the rising portion (a wall portion having a wall surface perpendicular to said flat surface) 15a of the base bed 15, and the optical axis of the laser unit 23 is horizontal relative to the upper surface of the base bed 15.

The flat surface and wall surface of the base bed are worked to a sufficiently high accuracy so that the finish accuracy of these surfaces does not cause deviation between the optical axes of the mounted optical parts.

The beam shaping prism 4 and the first polarizing beam splitter 5 are disposed in succession on the optical axis of the laser unit 23. The direction of emergence of a laser beam L transmitted through the polarizing beam splitter 5 is made parallel to the guide rails 20 so that the light beam L may impinge on the jump-up mirror 6 (not seen in FIG. 4) of the carriage portion 13, and the objective lens 1 is located in the direction of reflection above the mirror. The condensing lens 7, the second polarizing beam splitter 8 and the third polarizing beam splitter 9 are disposed in succession on the emergence optical axis of the first polarizing beam splitter 5 after reflection by a disk, not shown, which is located above the objective lens 1.

Accordingly, the laser beam L emitted from the laser unit 23 passes through the first polarizing beam splitter 5, emerges from the fixed head portion 14, travels parallel to the guide rails 20 and irradiates the surface of the disk via the jump-up mirror 6 and the objective lens 1. The laser beam reflected by the disk travels back along the same optical path, is reflected by the first polarizing beam splitter 5 and is divided by the second polarizing beam splitter 8 via the condensing lens 7. The reflected light enters a servo sensor (not shown), and the transmitted light is further divided by the third polarizing beam splitter 9, and the divided lights enter two RF sensors, and a focusing/tracking error signal for controlling the actuator 26 is detected from the servo sensor, and information recorded on the disk is read from the difference between signals detected by the two RF sensors.

As regards the light emerging from the fixed head portion 14, the adjustment of the optical axis is almost unnecessary because the base bed 15 is worked highly accurately. If the deviation of the optical axis is later caused by the movement of the carriage portion 13, offset will occur in the aforementioned servo sensor, but the influence of this offset can be electrically eliminated. Also, when mechanical adjustment is required, the rising portion 15a on which the laser unit 23 is mounted may be worked to thereby adjust the direction of the optical axis.

As described above, in the information recording-reproducing apparatus according to the present invention, the optical parts of the fixed head portion are directly mounted on the base bed of high accuracy. Therefore, the movement of the optical axis by temperature, heat cycle or a variation with time is prevented and thus, the apparatus is high in reliability.

Also, in the above-described embodiment, the focusing actuator and the tracking actuator are both carried on the carriage portion 13, but alternatively, only the focusing actuator may be carried on the carriage portion 13 and the tracking actuator may be mounted as a galvano mirror on the fixed head portion 14, i.e., the base bed 15. Also, optical elements (such as a grating and a quarter wavelength plate) other than those in the above-described embodiment may be mounted on the fixed head portion of the base bed 15.

The present invention permits various applications without departing from the scope of the invention as defined in the appended claims.

What is claimed is:

1. An information recording-reproducing apparatus for effecting at least one of recording, reproducing and erasing of information on a disk-like recording medium by a light beam, said apparatus comprising:

a base bed fixed to said apparatus;

a light source, directly fixed on a surface of said base bed, for emitting the light beam;

an optical system, directly fixed on the surface of said base bed, for guiding the light beam emitted from said light source to the recording medium;

a movable unit movable radially of the recording medium and carrying thereon at least an objective lens for applying onto the recording medium the light beam emitted from said light source and passed through said optical system; and a guide member, fixed on said base bed, for guiding said movable unit radially of the recording medium.

2. An information recording-reproducing apparatus according to claim 1, wherein said movable unit further comprises a focusing and/or tracking actuator for driving said objective lens in a focusing and/or tracking direction to adjust the focusing and/or tracking state of the light beam relative to the recording medium.

3. An information recording-reproducing apparatus according to claim 1, wherein the surface of said base bed on which said light source is fixed and the surface of said base bed on which said optical system is fixed are orthogonal to each other.

4. An information recording-reproducing apparatus according to claim 1, further comprising a linear motor fixed on said base bed for driving said movable unit radially of the recording medium.

5. An information recording-reproducing apparatus according to claim 1, wherein said optical system comprises a beam shaping optical element for shaping the light beam and a beam splitter for splitting the light beam emitted from said light source and a light beam reflected by the recording medium.

* * * * *